United States Patent
Meyers et al.

(10) Patent No.: US 8,602,146 B2
(45) Date of Patent: Dec. 10, 2013

(54) VEHICLE CONSTRUCTION METHOD TO PREVENT BATTERY DAMAGE IN REAR IMPACT USING OPTIMIZED BRACKET SEPARATION

(75) Inventors: Gerritt B. Meyers, Ypsilanti, MI (US); Jonathan R. Young, Dundee, MI (US); Jesse Buehler, Ypsilanti, MI (US); Naipaul Ramoutar, Ann Arbor, MI (US); Taichi Yamashita, Northville, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 1 day.

(21) Appl. No.: 13/443,106

(22) Filed: Apr. 10, 2012

(65) Prior Publication Data

US 2013/0264135 A1    Oct. 10, 2013

(51) Int. Cl.
*B60R 16/04*    (2006.01)
(52) U.S. Cl.
USPC ............................................ 180/68.5
(58) Field of Classification Search
USPC ............. 180/68.5; 280/782, 784; 296/187.03, 296/187.05, 187.08, 187.11
See application file for complete search history.

(56) References Cited

U.S. PATENT DOCUMENTS

| 5,501,289 | A | 3/1996 | Nishikawa et al. |
| 7,503,585 | B2 | 3/2009 | Hashimura et al. |
| 7,690,686 | B2 | 4/2010 | Hashimura et al. |
| 7,921,951 | B2 | 4/2011 | Watanabe et al. |
| 8,037,960 | B2 | 10/2011 | Kiya |
| 8,276,698 | B2 * | 10/2012 | Guss et al. .................. 180/68.5 |

FOREIGN PATENT DOCUMENTS

EP    1 992 513 A1    11/2008

OTHER PUBLICATIONS

International Search Report and Written opinion for cooresponding International Application No. PCT/US2013/035834 mailed on Jul. 12, 2013 in 8 pages.

* cited by examiner

*Primary Examiner* — John Walters
(74) *Attorney, Agent, or Firm* — Christopher G. Darrow; Young Basile Hanlon & MacFarlane P.C.

(57) ABSTRACT

A battery attachment bracket and method of assembly for protecting a battery of a motor vehicle from damage during a rear impact. The battery attachment bracket connects the battery to support structure of the motor vehicle in an area subject to deformation during a rear impact. The battery attachment bracket is formed by a body member extending from a battery-engaging surface to a vehicle-support-engaging surface. The vehicle-support-engaging surface has a bolt-receiving aperture, and a notch cut-out adjacent to the bolt-receiving aperture located in a vehicle-front direction with respect to the bolt-receiving aperture to define a narrowed portion of the battery attachment bracket. A gusset having an angled surface is located on a vehicle-front-facing surface of the battery attachment bracket. The gusset resists deformation of the battery attachment bracket and promotes separation of the battery attachment bracket from the support structure of the motor vehicle adjacent the bolt-receiving aperture.

18 Claims, 3 Drawing Sheets

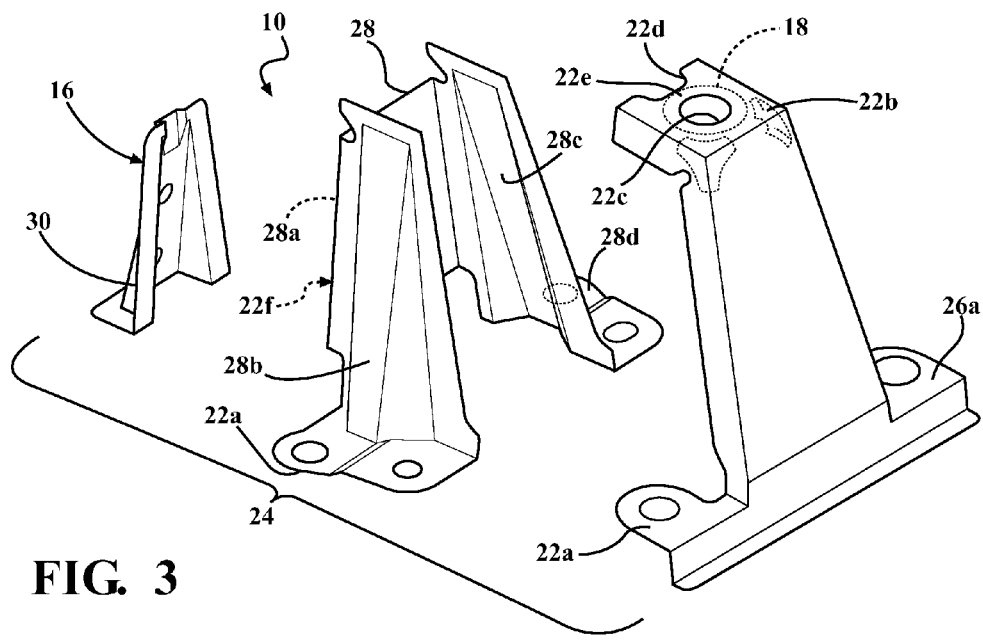
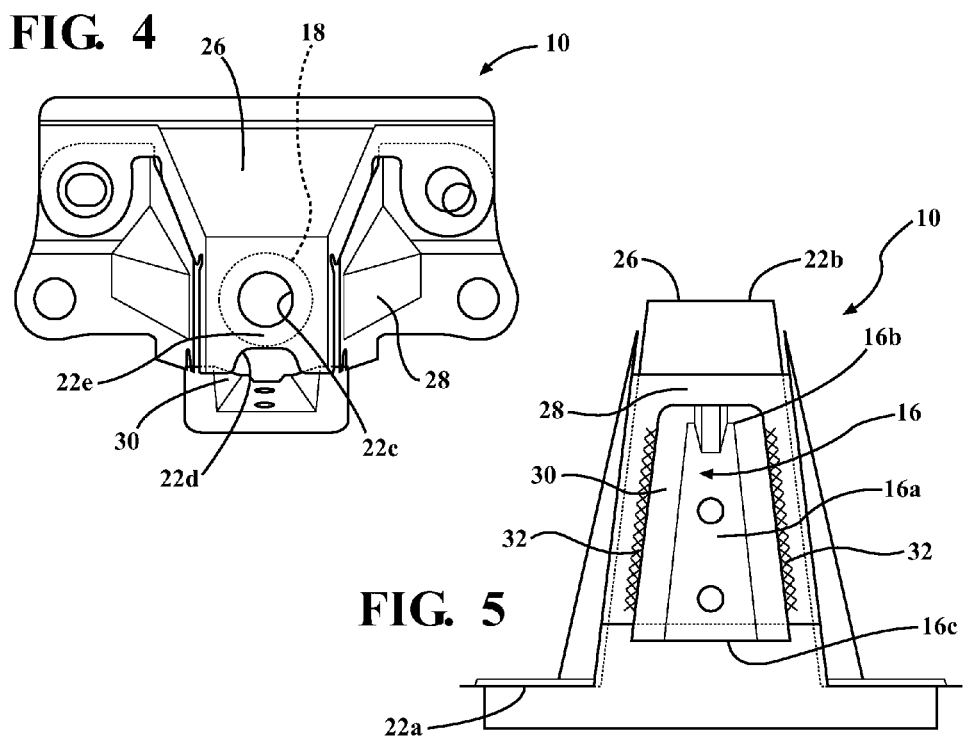

VEHICLE CONSTRUCTION METHOD TO PREVENT BATTERY DAMAGE IN REAR IMPACT USING OPTIMIZED BRACKET SEPARATION

FIELD OF THE INVENTION

The present invention relates to supports for battery cells on motor vehicles and, more particularly, to preventing battery damage during rear impact using an optimized bracket separation structure.

BACKGROUND

Various automotive support structures for battery cells of motor vehicles have been proposed. For example, U.S. Pat. No. 8,037,960 discloses a battery pack fixed to an upper side of a mount by bolts. The battery pack includes screw holes through which the bolts are inserted. The screw holes have closed shapes and are elongate in a front-rear direction, so that the battery pack moves when an impact is applied to the battery pack. In another example, U.S. Pat. No. 7,921,951 discloses a forward portion of a battery pack is fixed to an upper surface of a cross member by forward brackets welded to a forward portion of the battery pack. A rearward portion of the battery pack is fixed to upper surfaces of a rearward portion of a kick-up portion of two side members by a bridge interconnecting the two side members. The battery pack is turned upward as the forward portion of the kick-up portion deforms and the bridge is pushed upward.

SUMMARY

While the known battery cell support structures appear suitable for their intended purpose, it would be desirable to provide a battery cell support structure capable of preventing damage to a battery during rear impacts. It would be desirable to provide a battery support bracket with a controlled separation sequence to prevent battery cell damage located in a crush zone of the vehicle. It would be desirable to provide a controlled separation and deformation mode between the vehicle cross member and the battery attachment bracket during vehicle crush using a notch cut-out allowing the bracket to separate from the vehicle structure before deformation pulls the attachment bracket into contact with the battery body. It would be desirable to provide a deformation limiting gusset to prevent forward deformation of the bracket, where the battery support structure acts as a reaction surface.

In a support structure for protecting a battery of a motor vehicle from damage during a rear impact, a battery attachment bracket connects the battery to support structure of the motor vehicle in an area subject to deformation during a rear impact. The battery attachment bracket can include a body member extending from a battery-engaging surface to a vehicle-support-engaging surface. The vehicle-support-engaging surface can include a bolt-receiving aperture formed therein and a notch cut-out formed adjacent to the bolt-receiving aperture to define a narrowed portion of the battery attachment bracket located in a vehicle-front direction with respect to the bolt-receiving aperture.

A method is provided for assembling the battery attachment bracket. The battery attachment bracket is a welded assembly of a first member, a second member and a third member. The first member defines a vehicle-rear-facing surface and includes the vehicle-support-engaging surface and a portion of the battery-engaging surface. The vehicle-support-engaging surface includes a bolt-receiving aperture and a notch cut-out located in a vehicle-front direction from the bolt-receiving aperture. The second member defines a vehicle-front-facing surface and includes two side surfaces for assembly with respect to the first member. The second member also includes a portion of the battery-engaging surface. The third member defines a gusset having an angled surface with a narrow end adjacent the vehicle-support-engaging surface and an enlarged end adjacent the battery-engaging surface. The third member is assembled with respect to the vehicle-front-facing surface of the second member.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 3 is an exploded perspective view of the battery attachment bracket assembly;

FIG. 4 is a plan view of the battery attachment bracket;

FIG. 5 is a side view of the battery attachment bracket of FIG. 4, which is the side of the bracket facing the battery as illustrated in FIG. 1, sometimes referred to herein as a vehicle front facing side;

DETAILED DESCRIPTION

Figure 1:
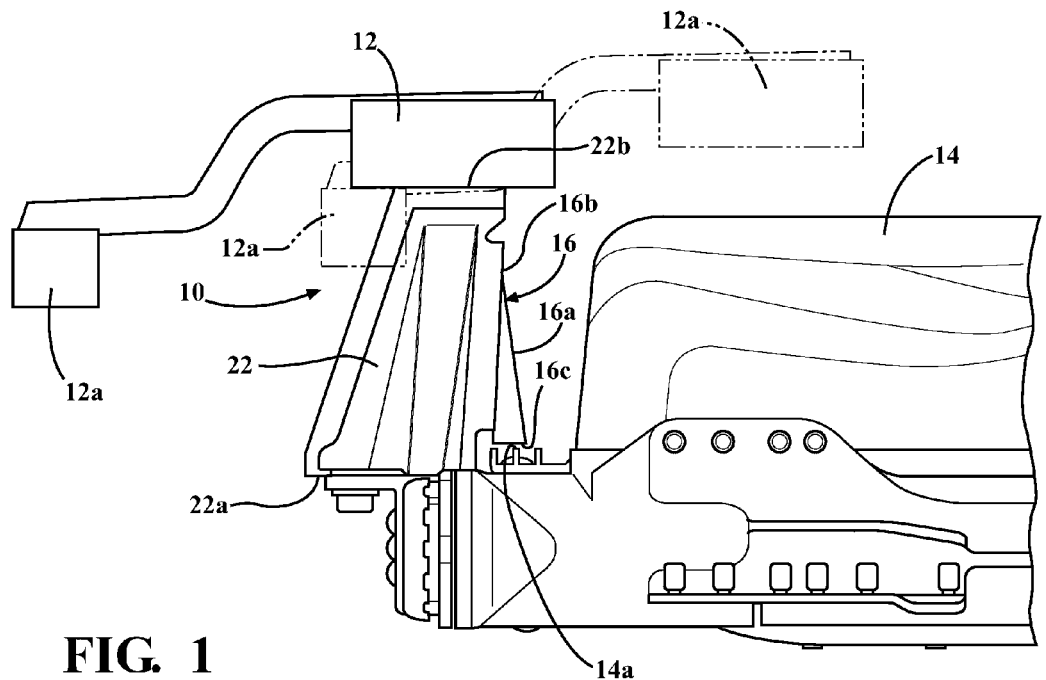
FIG. 1 is a side elevational view illustrating a battery pack for a vehicle connected by a battery attachment bracket to support structure of the motor vehicle and also showing movement of the support structure of the motor vehicle in phantom as a result of a rear impact to the vehicle.
Figure 2:
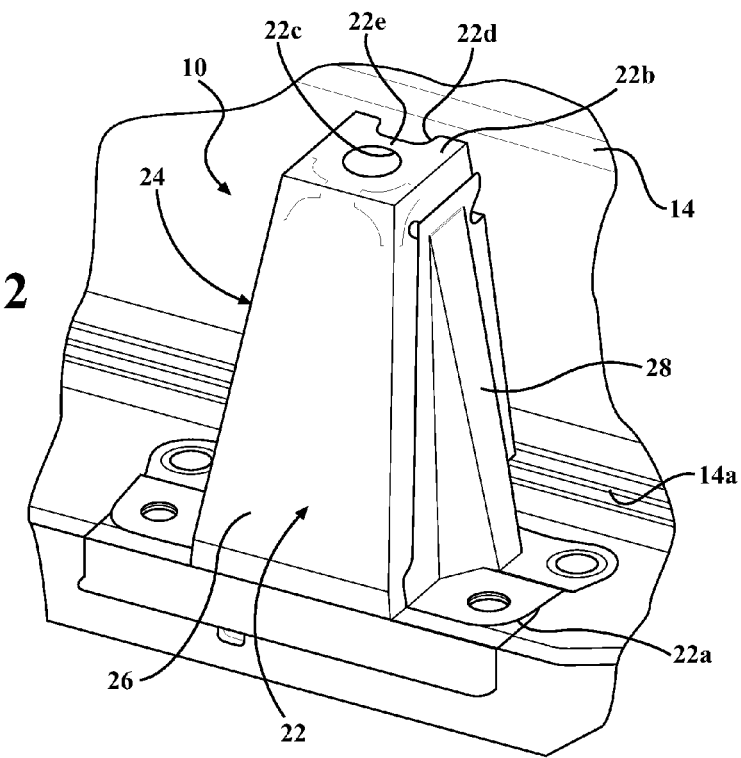
FIG. 2 is a perspective view of a vehicle support-engaging surface of the battery attachment bracket having a notch cut-out adjacent to a through bolt receiving aperture.
Figure 6:
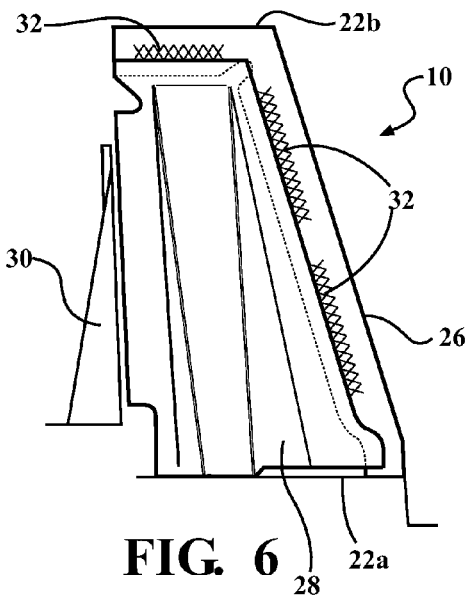
FIG. 6 is a side view of the battery attachment bracket of FIG. 4.
Figure 8:
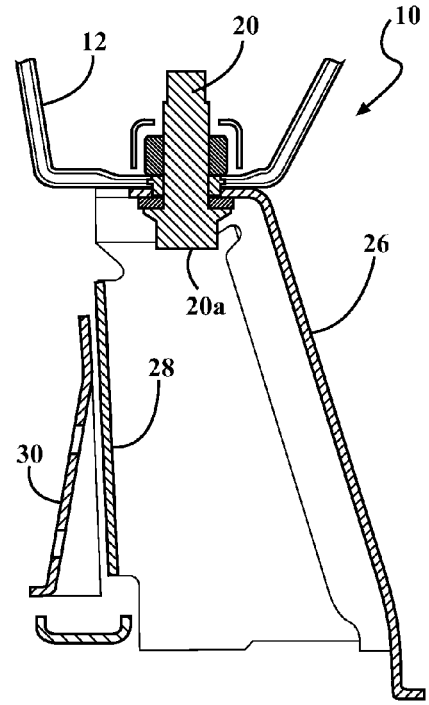
FIG. 8 is a cross sectional view of the battery attachment bracket taken as shown in FIG. 4.
Figure 7:
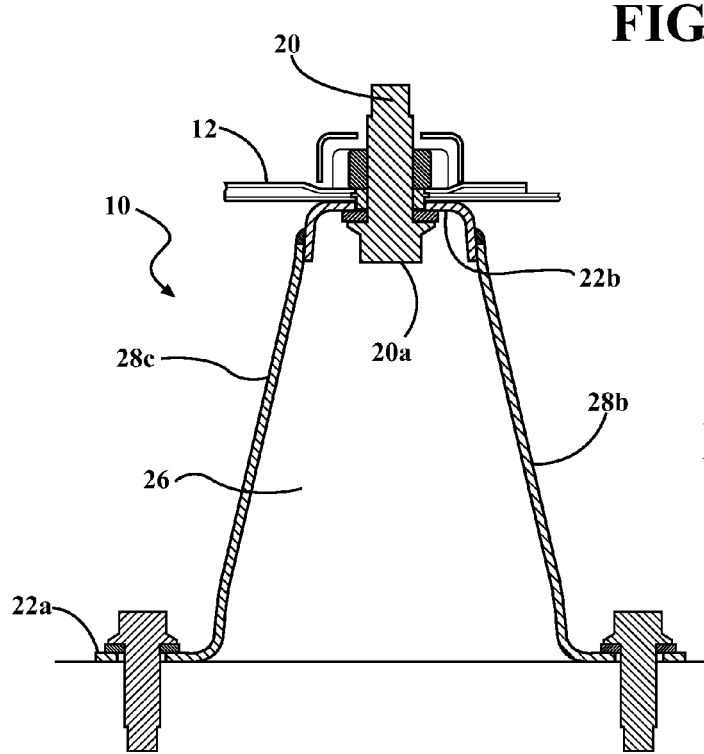
FIG. 7 is a cross sectional view of the battery attachment bracket taken as shown in FIG. 4.

Referring now to FIGS. 1-2, to prevent battery damage during rear impacts, the separation and deformation mode of a battery attachment bracket 10 are controlled between the support structure 12 of the motor vehicle, such as a cross member, and the battery attachment bracket 10, allowing the support structure 12 of the motor vehicle to deform upward and away from the battery 14 during vehicle crush. Minimizing the separation load between the vehicle support structure 12 and the attachment bracket 10 prevents the attachment bracket 10 from being pulled into contact with the battery 14. In addition, a deformation limiting gusset 16 prevents forward deformation of the attachment bracket 10 by using the battery-supporting structure 14a as a reaction surface.

If the battery 14 is placed in the deformation path of the battery attachment bracket 10, battery damage can occur during rear impact events. If the separation of the attachment bracket 10 requires too much force, the attachment bracket 10 may deform into the battery 14. In addition to the bolt separation event, later during the crash further deformation can allow a rear suspension structure 12a to contact the attachment bracket 10. A gusset 16 located on the attachment bracket 10 can resist a push from a rear suspension structure 12a by having a strong compressive resistance to a touch-off point on the battery-supporting structure 14a. The gusset 16 transfers rear impact load from the battery attachment bracket 10 to the battery-supporting structure 14a.

The attachment bracket 10 allows for a decreased separation load under crash conditions, but maintains fastening reliability requirements for typical use by maintaining a full contact area 18 between a fastening member, such as a bolt 20 and/or washer 20a, and the attachment bracket 10. This allows for maximum usage of space for placing batteries 14 in an area that would otherwise be impacted by the deforming attachment bracket 10, allowing for increased vehicle range.

By way of example and not limitation, during a rear impact event, the rear vehicle structure 12, 12a translates forward and then buckles in an overall upward direction. During the initial forward motion of the vehicle support structure 12, the attachment between the vehicle support structure 12 and the battery 14 is loaded in a way the pulls the attachment bracket 10 of the battery 14 forward, in a direction toward the battery 14. By reducing the cross-sectional area of the material adjacent a top bolt aperture 10a of the attachment bracket 10, the bolt 20 can tear through the attachment bracket 10 and release before the attachment bracket 10 deforms into the battery 14. A notch cut-out 10b allows the attachment bracket 10 to separate from the vehicle support structure 12 before the deformation of the vehicle support structure 12 pulls the attachment bracket 10 into contact with the main body of the battery 14.

Referring now to FIGS. 1-8, the battery attachment bracket 10 is illustrated for protecting the battery 14 of a motor vehicle from damage during a rear impact. The battery attachment bracket 10 can connect the battery 14 to support structure 12 of the motor vehicle in an area subject to deformation during a rear impact. The battery attachment bracket 10 can include a body member 22 extending from a battery-engaging surface 22a to a vehicle-support-engaging surface 22b. The vehicle-support-engaging surface 22b can have a bolt-receiving aperture 22c formed therein, and a notch cut-out 22d adjacent to the bolt-receiving aperture 22c located in a vehicle-front direction with respect to the bolt-receiving aperture 22c to define a narrowed portion 22e of the battery attachment bracket 10.

The notch cut-out 22d of the battery attachment bracket 10 is of sufficient size to allow the support structure 12 of the motor vehicle to separate from the battery attachment bracket 10 when a predetermined force is applied during a rear impact. The predetermined force is of a sufficient magnitude to be capable of driving the bolt 20 which extends through the bolt-receiving aperture 22c for holding the battery attachment bracket 10 to the support structure 12 of the motor vehicle tearing through the narrowed portion 22e of the battery attachment bracket 10 defined by the notch cut-out 22d. The notch cut-out 22d of the battery attachment bracket 10 is located completely external to a clamping surface area 18 defined with respect to a periphery of a fastening member, such as a bolt head and/or washer 20a of a bolt 20 to be received within the bolt-receiving aperture 22c of the battery attachment bracket 10. This configuration allows maximum clamping load of the fastening member, such as a bolt head and/or washer 20a through the full contact area 18. In other words, the clamping load is not reduced by a smaller contact area which would result from the notch cut-out 22d encroaching within the periphery of the fastening member, such as a bolt head and/or washer 20a.

The gusset 16 is located on a vehicle-front-facing surface 22f of the attachment bracket 10. The gusset 16 can have an angled surface 16a extending from a narrow end 16b adjacent the vehicle-support-engaging surface 22b to an enlarged end 16c adjacent the battery-engaging surface 22a. The enlarged end 16c of the gusset 16 engages with a battery-supporting structure 14a in response to deformation of the battery attachment bracket 10 during a rear impact of sufficient force to drive the support structure 12 of the motor vehicle in a vehicle-front direction. The enlarged end 16c of the gusset 16 resists further deformation of the battery attachment bracket 10 and promotes separation of the battery attachment bracket 10 from the support structure 12 of the motor vehicle adjacent the bolt-receiving aperture 22c. The gusset 16 transfers crushing rear impact load from rear vehicle structure 12a contacting the battery attachment bracket 10 after release from the support structure 12 of the motor vehicle to the battery-supporting structure 14a thereby protecting the battery 14 from damage.

As best seen in FIG. 3, the body member 22 of the battery attachment bracket 10 can include an assembly 24 of a first member 26 defining a vehicle-rear-facing surface, a second member 28, and a third member 30. The first member 26 can include a portion 26a of the battery-engaging surface 22a and the vehicle-support-engaging surface 22b. The second member 28 can define a vehicle-front-facing surface 28a and two side surfaces 28b, 28c for assembly with respect to the first member 26. The second member 28 can also include a portion 28d of the battery-engaging surface 22a. A third member 30 can define the gusset 16 having the angled surface 16a with a narrow end 16b adjacent the vehicle-support-engaging surface 22b and an enlarged end 16c adjacent the battery-engaging surface 22a. The third member 30 is assembled with respect to the vehicle-front-facing surface 28a of the second member 28. The first, second, and third members 26, 28, 30 are welded to one another to form a unitary assembly 24 defining the battery attachment bracket 10.

A method for assembly the battery attachment bracket 10 is disclosed. The method can include forming the body member 22 with the vehicle-support-engaging surface 22b, forming the bolt-receiving aperture 22c in the vehicle-support-engaging surface 22b, and forming the notch cut-out 22d in the vehicle-support-engaging surface 22b in a vehicle-front direction with respect to the bolt-receiving aperture 22c to define the narrowed portion 22e of the battery attachment bracket 10 to facilitate separation of the battery attachment bracket 10 from a support structure 12 of the motor vehicle during rear impact deformation. The gusset 16 can be provided on the battery-facing surface 22f of the battery attachment bracket 10 to resist deformation of the battery attachment bracket 10 into the battery 14 prior to separation of the battery attachment bracket 10 from the support structure 12 of the motor vehicle and to transfer rear impact load from the battery attachment bracket 10 to the battery-supporting structure 14a during and after separation of the battery attachment bracket 10 from the support structure 12 of the motor vehicle.

The body member forming method can include forming the first member 26 with the vehicle-support-engaging surface 22b and a portion 26a of the battery-support-engaging surface 22a, and forming the second member 28 with the battery-facing surface 28a, two side walls 28b, 28c for attachment to the first member 26, and the portion 28d of a battery-support-engaging surface 22a. The method can include forming the third member 30 with the gusset 16 for attachment to the battery-facing surface 28a of the second member 28. The process can include forming the gusset 16 with an angled surface 16a having a narrow end 16b adjacent the vehicle-support-engaging surface 22b and the enlarged end 16c adjacent the battery-support-engaging surface 22a. The process can form the battery attachment bracket 10 as an assembly 24 of the first, second, and third members 26, 28, 30 welded together along weld lines 32 into a single unitary body member 22.

As best seen in FIG. 1, during a rear impact the vehicle support structure 12, 12a is driven toward the battery 14 in an upward trajectory as shown in phantom lines. The battery attachment bracket 10 is initially deformed toward the battery until the gusset 16 is driven inward and downward into contact with battery-supporting structure 14a. At this point, the resistance of the battery attachment bracket 10 is substantially increased against further deformation toward the battery 14 and the bolt 20 is loaded with sufficient force to tear through the narrowed portion 22f defined by the notch cut-out 22e of the battery attachment bracket 10. This prevents intrusion of the battery attachment bracket 10 into the battery 14. Furthermore, if additional vehicle support structure, by way of example and not limitation such as a rear suspension structure 12a, contacts the battery attachment bracket 10 after release of the bolt 20, the rear impact load is transferred to the battery-supporting structure 14a away from the battery 14 by engagement of the gusset 16 with the battery-supporting structure 14a.

While the invention has been described in connection with what is presently considered to be the most practical embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A battery attachment bracket for protecting a battery of a motor vehicle from damage during a rear impact, the battery attachment bracket for connecting the battery to support structure of the motor vehicle in an area subject to deformation during the rear impact, the battery attachment bracket comprising:
   a body member extending from a battery-engaging surface to a vehicle-support-engaging surface, the vehicle-support-engaging surface having a bolt-receiving aperture formed therein, and a notch cut-out adjacent to the bolt-receiving aperture located in a vehicle-front direction with respect to the bolt-receiving aperture to define a narrowed portion of the battery attachment bracket.

2. The battery attachment bracket of claim 1, wherein the notch cut-out of the battery attachment bracket is of sufficient size to allow the support structure of the motor vehicle to separate from the battery attachment bracket when a predetermined force is applied during the rear impact, the predetermined force being of sufficient magnitude to be capable of driving a bolt which extends through the bolt-receiving aperture for holding the battery attachment bracket to the support structure of the motor vehicle tearing through the narrowed portion of the battery attachment bracket defined by the notch cut-out.

3. The battery attachment bracket of claim 1, wherein the notch cut-out of the battery attachment bracket is located completely external to a clamping surface area defined with respect to a periphery of a bolt to be received within the bolt-receiving aperture of the battery attachment bracket.

4. The battery attachment bracket of claim 1 further comprising:
   a gusset located on a vehicle-front-facing surface of the bracket and having an angled surface extending from a narrow end adjacent the vehicle-support-engaging surface to an enlarged end adjacent the battery-engaging surface.

5. The battery attachment bracket of claim 4, wherein the enlarged end of the gusset engages with a battery-supporting structure in response to deformation of the battery attachment bracket during a rear impact of sufficient force to drive the support structure of the motor vehicle in a vehicle-front direction.

6. The battery attachment bracket of claim 4, wherein the enlarged end of the gusset resists further deformation of the battery attachment bracket and promotes separation of the battery attachment bracket from the support structure of the motor vehicle adjacent the bolt-receiving aperture.

7. The battery attachment bracket of claim 4, wherein the gusset transfers rear impact load from other vehicle structure contacting the battery attachment bracket after release from the support structure of the motor vehicle to battery-supporting structure thereby protecting the battery from damage.

8. The battery attachment bracket of claim 1, wherein the body member of the battery attachment bracket further comprises:
   an assembly of a first member defining a vehicle-rear-facing surface, the first member including a portion of the battery-engaging surface and the vehicle-support-engaging surface, a second member defining a vehicle-front-facing surface and two side surfaces for assembly with respect to the first member, the second member including a portion of the battery-engaging surface, and a third member defining a gusset having an angled surface with a narrow end adjacent the vehicle-support-engaging surface and an enlarged end adjacent the battery-engaging surface, the third member for assembly with respect to the vehicle-front-facing surface of the second member.

9. The battery attachment bracket of claim 8, wherein the first, second, and third members are welded to one another to form a unitary assembly.

10. A battery attachment bracket for protecting a battery of a motor vehicle from damage during a rear impact, the battery attachment bracket for connecting the battery to support structure of the motor vehicle in an area subject to deformation during a rear impact, the battery attachment bracket comprising:
    a body member extending from a battery-engaging surface to a vehicle-support-engaging surface, the vehicle-support-engaging surface having a bolt-receiving aperture formed therein and a notch cut-out adjacent to the bolt-receiving aperture, the body member defined by a welded assembly of a first member defining a vehicle-rear-facing surface, the first member including a portion of the battery-engaging surface and the vehicle-support-engaging surface, a second member defining a vehicle-front-facing surface and two side surfaces for assembly with respect to the first member, the second member including a portion of the battery-engaging surface, and a third member defining a gusset having an angled surface with a narrow end adjacent the vehicle-support-engaging surface and an enlarged end adjacent the battery-engaging surface, the third member for assembly with respect to the vehicle-front-facing surface of the second member, wherein the notch cut-out of the battery attachment bracket is located in a vehicle-front-facing direction with respect to the bolt-receiving aperture and is of sufficient size to allow the support structure of the motor vehicle to separate from the battery attachment bracket when a predetermined force is applied during the rear impact, the predetermined force being of sufficient magnitude to be capable of driving a bolt which extends through the bolt-receiving aperture for holding the battery attachment bracket to the support structure of the motor vehicle tearing through a narrowed portion of the battery attachment bracket defined by the notch cut-out, wherein the notch cut-out of the battery attachment bracket is located completely external to a clamping surface area defined with respect to a periphery of a fastening member to be received within the bolt-receiving aperture of the battery attachment bracket, and a gusset located on a vehicle-front-facing surface of the battery attachment bracket and having an angled surface extending from a narrow end adjacent the vehicle-support-engaging surface to an enlarged end adjacent the battery-engaging surface.

11. The battery attachment bracket of claim 10, wherein the enlarged end of the gusset engages with a battery-supporting structure in response to deformation of the battery attachment bracket during a rear impact of sufficient force to drive the support structure of the motor vehicle in a vehicle-front direction.

12. The battery attachment bracket of claim 11, wherein, after engagement with the battery-supporting structure, the enlarged end of the gusset resists further deformation of the battery attachment bracket and promotes separation of the battery attachment bracket from the support structure of the motor vehicle adjacent the bolt-receiving aperture.

13. The battery attachment bracket of claim 12, wherein the gusset transfers rear impact load from other vehicle structure contacting the battery attachment bracket after release from the support structure of the motor vehicle to battery-supporting structure, thereby protecting the battery from damage.

14. A method for assembly a battery attachment bracket comprising:
   forming a body member with a vehicle-support-engaging surface;
   forming a bolt-receiving aperture in the vehicle-support-engaging surface;
   forming a notch cut-out in the vehicle-support-engaging surface in a vehicle-front direction with respect to the bolt-receiving aperture to define a narrowed portion of the battery attachment bracket to facilitate separation of the battery attachment bracket from a support structure of a motor vehicle during rear impact deformation; and
   providing a gusset on a battery-facing surface of the battery attachment bracket to resist deformation of the battery attachment bracket into the battery prior to separation of the battery attachment bracket from the support structure of the motor vehicle and to transfer rear impact load from the battery attachment bracket to a battery support structure during and after separation of the battery attachment bracket from the support structure of the motor vehicle.

15. The method of claim 14, wherein the body member forming further comprises:
   forming a first member with a vehicle-support-engaging surface and a portion of a battery-support-engaging surface; and
   forming a second member with a battery-facing surface, two side walls for attachment to the first member and a portion of a battery-support-engaging surface.

16. The method of claim 15, wherein the body member forming further comprises:
   forming a third member with the gusset for attachment to the battery-facing surface of the second member.

17. The method of claim 16, wherein the body member forming further comprises:
   forming the gusset with an angled surface having a narrowed end adjacent the vehicle-support-engaging surface and an enlarged end adjacent the battery-support-engaging surface.

18. The method of claim 16, wherein the body member forming further comprises:
   welding the first, second and third members with respect to one another to define a unitary body member.

* * * * *